UNITED STATES PATENT OFFICE.

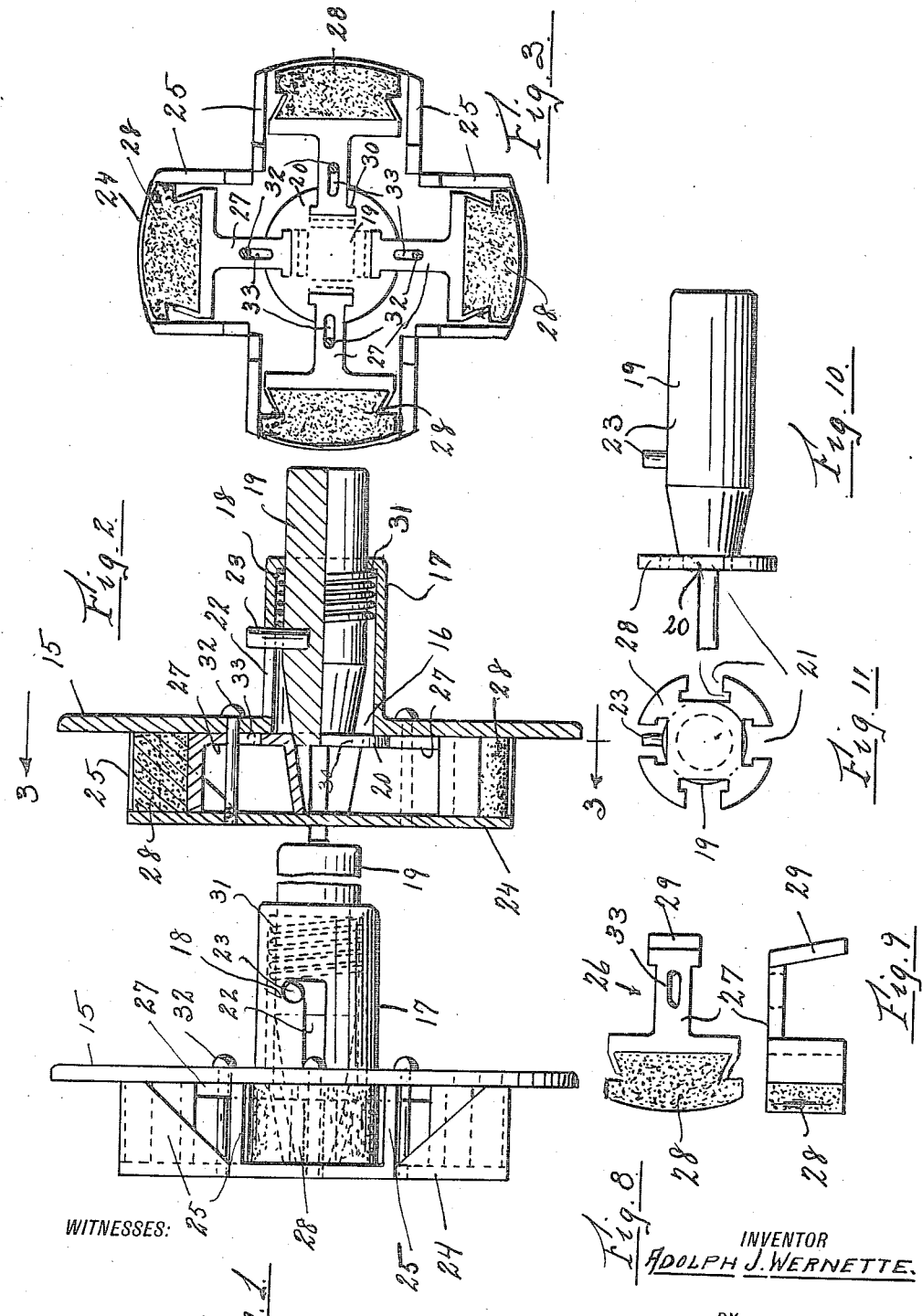

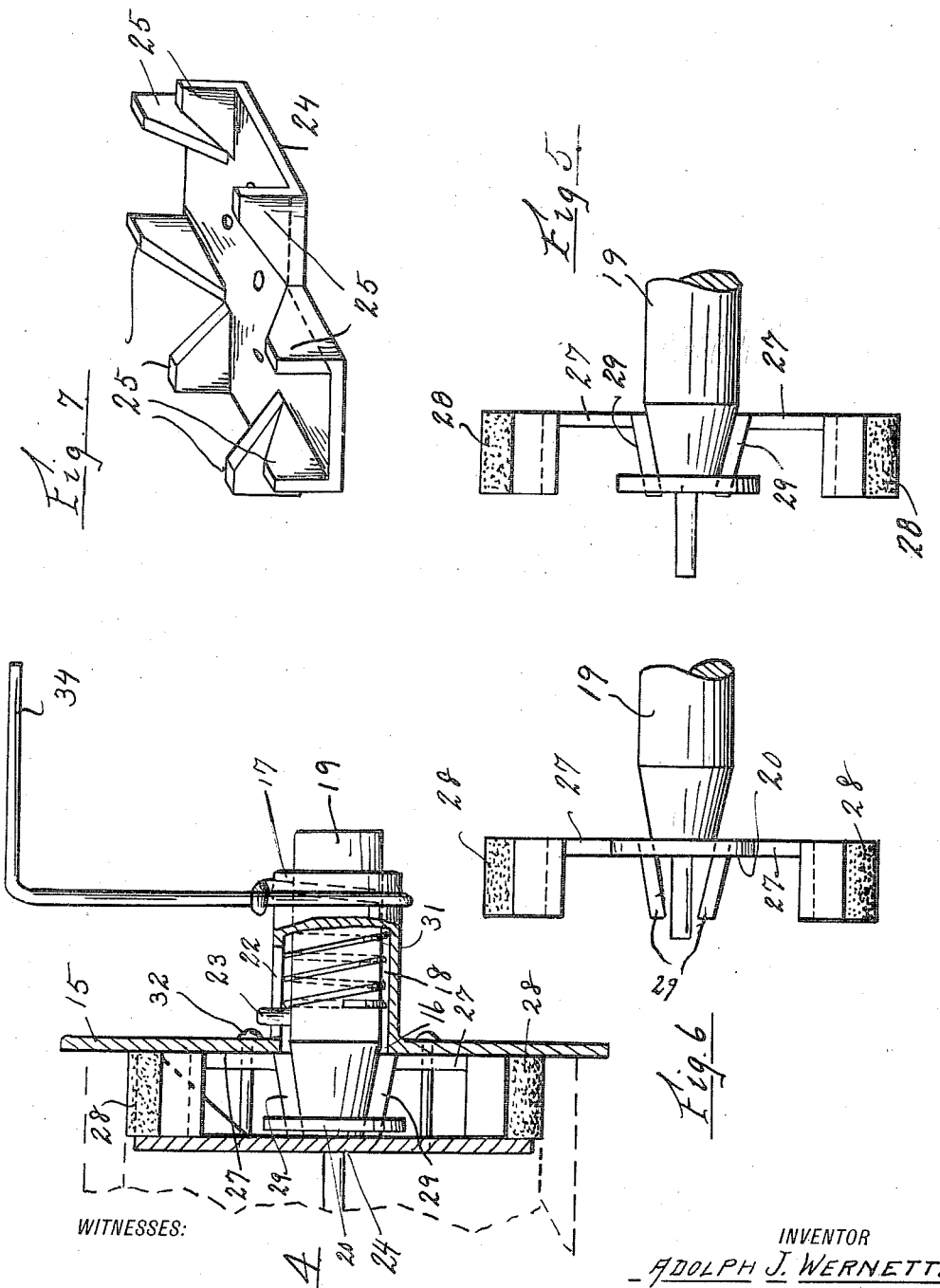

ADOLPH J. WERNETTE, OF LOS ANGELES, CALIFORNIA, ASSIGNOR OF ONE-HALF TO BEN R. FARRAR AND ONE-HALF TO ANNIE E. WERNETTE, BOTH OF LOS ANGELES, CALIFORNIA.

SELF-ADJUSTING GRINDER.

1,305,759. Specification of Letters Patent. Patented June 3, 1919.

Application filed January 24, 1919. Serial No. 272,801.

*To all whom it may concern:*

Be it known that I, ADOLPH J. WERNETTE, a citizen of the United States, residing in Los Angeles, in the county of Los Angeles, State of California, have invented certain new and useful Improvements in Self-Adjusting Grinders, of which the following is a specification.

My invention relates primarily to a grinder for use on piston rings, cylinders and commutators for explosion engines, and the object thereof is to provide a simple and efficient device for that purpose, which will automatically adjust itself to the opening it is desired to grind.

A further object is to provide a grinder for the above purpose in which the pressure of the grinding units is automatically regulated, whereby the pressure is equalized on each unit.

Other objects and advantages will appear hereinafter and while I have shown and will describe the preferred form of my invention it will be understood that I do not limit myself to such preferred form of construction or use, but that various changes and adaptations may be made therein without departing from the spirit of my invention.

In the drawings accompanying and forming a part of this specification;

Figure 1 is a side elevation, partly broken away, of my invention in its position of non-use.

Fig. 2 is a section on a line at right angles to Fig. 1.

Fig. 3 is a section on the line 3—3 of Fig. 2.

Fig. 4 is a view similar to Fig. 2 with the grinding units expanded.

Figs. 5 and 6 are detailed views of the grinders and their expander, showing the grinders in position of use and non-use respectively.

Fig. 7 is a perspective view of a portion of my device.

Figs. 8 and 9 are a plan and side elevation respectively of the grinders.

Figs. 10 and 11 are a side elevation and bottom plan respectively of the expander.

Referring to the drawings my device comprises a flange 15 of a diameter sufficient to extend across the opening it is desired to grind, centrally of which is a hole 16 surrounded by an outwardly extending casing 17 in which casing is provided a spring chamber 18. Slidably mounted in chamber 18 is a plunger 19 cylindrical in cross section the inner end of which is tapered to a smaller diameter and has provided on its smaller end a flange or collar 20. Provided in flange 20 are a plurality of radial T-shaped openings 21 the smaller end of which opens outwardly. Provided in the side of casing 17 is a substantially L-shaped slot 22, extending longitudinally thereof, and a pin 23 extending outwardly from plunger 19 is adapted to project through said slot for a purpose hereafter explained. Secured to the side of flange 15 opposite casing 17 is a grinder casing 24 which is in top plan the shape of a cross and is provided with inturned flanges 25 the upper ends of which normally bear against said flange 15 and form guideways for the grinders to confine the same to a radial path of movement. Mounted in the guideways of casing 24 to slide therein are the grinders 26. Grinders 26 comprise a substantially Y-shaped member 27 in the forked portion of which are mounted abrasive members 28. The other end of member 27 terminates in a guide member 29 which is of a width to fit the wide portion 30 of flange 20 and extends downwardly and inwardly at an angle, so that when said flange 20 is lowered said members 26 will be projected outwardly and vice versa. Mounted within spring chamber 18 between the outer ends thereof and pin 23, and coiled around plunger 19 is a coil spring 31 which acts to force said plunger downwardly when the device is in use. Screws or other fastening means 32 provide means for securing casing 24 to flange 15, slots 33 being provided in grinder member 27 to avoid interference with the movement thereof.

In the operation of my device the device will be positioned within the opening to be ground in the positions shown in Figs. 1, 2 and 3. Pin 23 will then be moved to extend into the longitudinal portion of slot 22 when spring 31 will project plunger 19 and flange 20 inwardly thus forcing the grinder members outwardly into contact with the surface to be ground. The device is then rotated by means of handle 34, spring 31 acting to force plunger 19 inwardly. By moving pin 23 outwardly and into the offset portion of slot 22 the device is locked in its inoperative position.

Having described my invention what I claim is:

A self-adjusting grinder comprising a casing adapted to be projected into the opening to be ground; a flange on said casing adapted to project across the opening to be ground; a casing projecting outwardly from said flange centrally thereof; a plunger slidably mounted in said last casing adapted to be projected into said first casing; a slot in said outwardly projecting casing; a pin in said plunger projecting into said slot; a spring in said casing coiled around said plunger between said pin and the outer end of said casing adapted to cause said plunger to slide longitudinally; a flange on the inner end of said plunger provided with a plurality of T-shaped slots open at their smaller ends; a plurality of radially extending grinders slidably mounted in said first casing having their inner ends of a shape to fit said T-shaped slots, said ends extending downwardly and inwardly at an angle, whereby said grinders are expanded or contracted by the movement of said flange and plunger.

In witness that I claim the foregoing I have hereunto subscribed my name this 17th day of January, 1919.

ADOLPH J. WERNETTE.